Feb. 8, 1966    R. F. COTTRELL ETAL    3,233,834
SEALING MEANS FOR ROCKET NOZZLE AND JET
DEFLECTION DEVICE MOUNTED THEREON
Filed July 9, 1962

INVENTOR.
RICHARD F. COTTRELL
RALPH S. KELLEY, JR.
BY JOHN C. MARTIN
FRANK S. THOMAS, JR.

*ATTORNEY*

United States Patent Office 3,233,834
Patented Feb. 8, 1966

3,233,834
SEALING MEANS FOR ROCKET NOZZLE AND JET DEFLECTION DEVICE MOUNTED THEREON
Richard F. Cottrell, Carmichael, Ralph S. Kelley, Jr., Rancho Cordova, John C. Martin, Fair Oaks, and Frank S. Thomas, Jr., Santa Monica, Calif., assignors to Aerojet-General Corporation, Azusa, Calif., a corporation of Ohio
Filed July 9, 1962, Ser. No. 208,982
6 Claims. (Cl. 239—265.35)

This invention relates generally to a rocket and, more specifically, to means for sealing the space between a rocket nozzle and a jet deflection device mounted thereon which is known in the rocket art as a jetevator.

In jetevator control systems a defect has been that there is high velocity leakage of high temperature rocket gases between the jetevator and the rocket nozzle. This leakage of high temperature gases is known in the rocket art as blowback and such leakage permits the gases to play upon the head of the rocket chamber and on other important elements of the rocket such as control actuators, hydraulic lines, pumps, and the like. The impact of high temperature rocket gases in these elements of the rocket can result in the destruction of the rocket. In addition, the blowback of gases between the jetevator and the nozzle surface results in flow instability in the rocket nozzle so as to produce unreliable control forces. The leakage of these gases also causes erosion of the jetevator surfaces and of the nozzle exit lip to be more severe than would be the case if leakage were not present.

It is therefore the principal object of the present invention to provide a sealing means between a jetevator and a rocket nozzle to prevent the blowback of rocket gases between the surfaces thereof and to thereby eliminate the deleterious effect of such gases as mentioned hereinabove.

A further object of the invention is to provide a sealing means between the forward portion of a jetevator and the rocket nozzle so that the sealing means will not be moved into the jet stream discharging from the rocket nozzle where it would be rapidly destroyed.

In its principal aspect, the present invention comprises a jetevator in the form of a ring surrounding a rocket nozzle and having an interior spherical surface conforming in shape to an exterior spherical surface on the rocket nozzle. A sealing means is provided between the two above-mentioned surfaces and is located at the forward edge of the ring member so that it will prevent the blowback of gases during any angular position of the ring member when the rear portion thereof deflects gases exhausting from the rocket nozzle.

Other objects, aspects, and advantages will become apparent from the following description in connection with the accompanying drawings wherein.

Figures 1, 2:
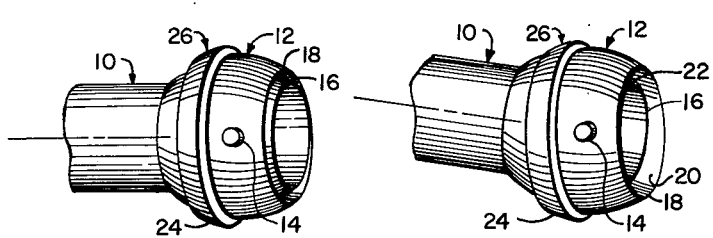
FIGURE 1 is a perspective view of the rear portion of a rocket thrust chamber having a nozzle with a jetevator pivotally mounted thereon.
FIGURE 2 is a perspective view similar to FIGURE 1 but with the jetevator positioned at an angle to the axis of the thrust chamber.

Referring now to FIGURES 1 and 2, a rocket thrust chamber 10 has mounted thereon a jetevator 12 by pivot members 14, there being one of such pivot members on each side of the jetevator but only one being shown. The jetevator 12 is a full jetevator or one which surrounds the nozzle completely and the axis of the jetevator normally coincides with that of the thrust chamber 10. When it is desired to change the direction of flight of the thrust chamber 10, the jetevator 12 is shifted by control means, not shown, about the pivot members 14 into a position such as shown in FIGURE 2. In this position the interior surface of the jetevator deflects gases exhausting from the nozzle 16 of the thrust chamber thereby changing the direction of flight of the thrust chamber 10. Although the jetevator 12 is merely shown as being capable of pivotal movement about the pivot members 14, it is to be understood that the jetevator may be of the type which rotates around the lateral axis of the nozzle whereby full control of the jetevator for movement into the path of gases exhausting from the nozzle is obtained. The jetevator 12 includes a ring member 18 which surrounds the nozzle 16 and has a spherical interior surface 20. The nozzle 16 also has a spherical exterior surface 22 which conforms in shape to the surface 20 of the ring member 18.

Figures 3, 4:
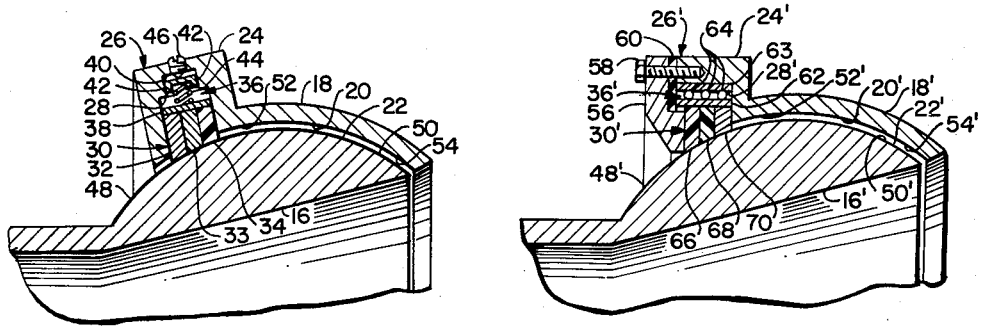
FIGURE 3 is a partial longitudinal sectional view on an enlarged scale, of the assembly illustrated in FIGURE 1 showing details of sealing means in accordance with this invention.
FIGURE 4 is a view similar to FIGURE 3 but showing a different embodiment of the invention.

As seen in FIGURE 3, the spherical interior surface 20 is spaced slightly from the spherical exterior surface 22 of the nozzle 16. This spacing or clearance is exaggerated in the drawing but in practice it is generally only about 7/100 of an inch so as to provide free movement of the ring member 18 over the surface of the nozzle 16. A shoulder 24 is provided on the forward portion of the ring member 18 and contains the sealing means, generally designated by numeral 26, of this invention.

Shoulder 24 on the ring member 18 has an annular cut-out portion 28 opening through the spherical interior surface 20 thereof. A generally annular sealing member generally designated by numeral 30 is mounted in the annular cut-out portion 28. The sealing member 30 has an internal surface spherical in shape to conform to the exterior surface 22 of the nozzle 16 to thereby provide a close sealing relationship. The sealing member may be comprised of several split rings or segments, three of such segments being shown in the embodiment of FIGURE 3. The two forward segments 32, 33 may be formed of cast iron, while the rear segment 34 may be formed of a glass filled phenolic resin which has a high temperature resistance. In the space or annular chamber 36 defined between the outer periphery of the sealing member 30 and the inner periphery of the cut-out portion 28 there is provided a split ring 38 which surrounds the segments 32, 33, and 34 of the sealing member 30. The shoulder 24 is provided with a plurality of bores 40, only one being shown in FIGURE 3, each of which contains a spring retainer member 42. A spring 44 is mounted in the retainer 42 and bears against the upper surface of the split ring 38. It can be seen that the spring 44 exerts a biasing force against the split ring 38 which distributes that force over all of the segments 32, 33, and 34 of the sealing member 30, thereby urging the segments against the nozzle surface 22. A set screw 46 may be provided in the shoulder 24 which abuts against the upper surface of the spring retainer 42 and serves the purpose of permitting adjustment of the force of the spring 44 against the sealing member 30.

The spherical exterior surface 22 of nozzle 16 can be considered as being divided into a diverging portion 48 and a converging portion 50. Likewise the spherical interior surface 20 of the ring member 18 may be divided into a diverging portion 52 and a converging portion 54.

It is important that the sealing means 26 be mounted on the forward portion of the ring member 18 or, in other words, that it be provided between the diverging portions 52 and 48 of the ring member 18 and nozzle 16, respectively. In this position, the sealing means 26 will most effectively prevent the blowback of gases exhausted through the nozzle of the thrust chamber 10 during all positions of the jetevator 12. If the sealing means 26 were mounted between the converging portions 50 and 54 of the nozzle 16 and ring member 18, respectively, it would be subjected more directly to the hot gases and flames exhausting from the nozzle 16. This is because when the ring member 18 is shifted so that the spherical internal surface 20 thereof lies in the path of gases and flames exhausting from the nozzle, such as in the position shown in FIGURE 2, the sealing means would be quickly destroyed by the flames.

An embodiment of the invention is shown in FIGURE 4 in which similar elements, as seen in FIGURE 3, are designated by the same numeral with an addition of a prime notation. In this embodiment, the annular cut-out portion 28' opens through the forward edge of the shoulder 24' on ring member 18' and is closed by an annular retaining ring 56. The ring 56 is mounted or secured to the shoulder 24' by a plurality of screws 58, only one being shown in FIGURE 4. An asbestos ring 60 may be provided between the surfaces of the retainer ring 56 and shoulder 24' to prevent any gases which may become trapped in the annular cutout portion 28' from escaping through the surfaces of these members. A means for providing a biasing force to the outer periphery of the sealing member 30' includes two radially spaced rings 62, 63 having mounted therebetween three annular coil springs 64. The rings 62, 63 together with the springs 64 form a unitary spring assembly which simplifies the assembling of the springs 64 in the chamber 36'. This embodiment has the advantage that the retainer ring 56 may be adjustably mounted against the shoulder 24' by screws 58, thereby permitting the axial pressure exerted against the segments of the sealing member 30' to be varied. This in turn will somewhat vary the force which the sealing member 30' will exert against the spherical exterior surface 22' of the nozzle 16'. Also, by this arrangement, when the sealing member 30' becomes worn it may be quickly replaced by merely removing the retaining ring 56. This provides an advantage over the embodiment shown in FIGURE 3 in which the entire ring member 18 would have to be disassembled from the nozzle 16 to replace the sealing member 30 therein.

In the embodiment shown in FIGURE 4, a different arrangement and composition of the segments of the sealing member 30' is provided. In this embodiment, the segments include a front segment 66 which may be formed of a phenolic resin which has a high temperature resistance. The intermediate segment 68 may be formed of graphite which provides lubrication between the surface of the sealing member 30' and the exterior spherical surface 22'. The most rearward segment 70 which is closest to the flame and gases exhausting from the nozzle 16' may be formed of cast iron.

Figure 5:
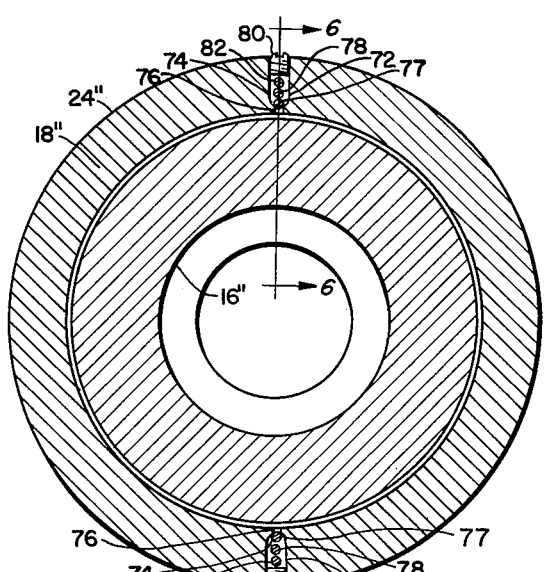
FIGURE 5 is a transverse sectional view through the gas conducting passages of the jetevator of another embodiment of the invention.
Figure 6:
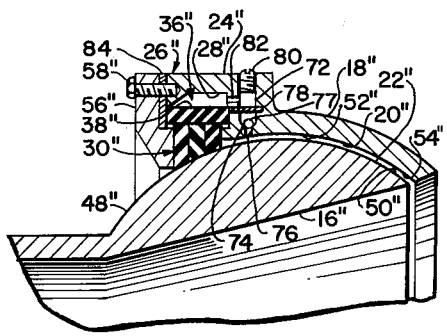
FIGURE 6 is a partial sectional view taken on line 6—6 of FIGURE 5.

A third embodiment of the invention is shown in FIGURES 5 and 6 wherein elements similar to those in FIGURES 3 and 4 are indicated by the same numerals with the addition of a double prime notation. As best seen in FIGURE 6, a generally radial gas conducting passage 72 is provided in the shoulder 24" and is formed with a valve seat 74 at the bottom thereof. The valve seat 74 is connected to a port 76 which opens to the space between the converging portions of surfaces 50" and 54" of the nozzle 16" and ring element 18", respectively. A ball check 77 normally sits in the valve seat 74. A limit pin 78 is mounted in the shoulder 24" and extends across the passage 72 slightly above the ball check 77 thus permitting some upward movement of the ball check. The outer portion of the gas conducting passage 72 is closed by set screw 80 which is provided for the purpose to permit assembly of the ball check 77 into the passage 72. A second passage 82 connects passage 72 to the annular chamber 36". It will be appreciated that when there is a blowback of gases from the nozzle 16" the gases will flow to the port 76 through the space between the spherical interior surface 20" and spherical exterior surface 22" of the ring member 18" and nozzle 16", respectively. The gases being under high pressure will cause the ball check 77 to be lifted up against the limit pin 78. Gases will then flow past the ball check 77 to the passage 82 and into the annular chamber 36". There the gases will press against the split ring 38" thus forcing the sealing member 30" against the exterior spherical surface 22" of the nozzle 16". By this arrangement, it can be appreciated that the greater the pressure is of the blowback gases, the greater the force there will be exerted against the sealing member 30".

As seen in FIGURE 5, it is preferable that a second gas conducting passage 72 and valve arrangement be provided at a position diametrically opposed to the first valve arrangement. This arrangement will provide a pressurizing of the sealing members 30" by blowback gases regardless of the angular position of the ring member 18" relative to the nozzle 16".

It is also preferable in this embodiment that shims 84 be mounted between the retaining ring 56" and shoulder 24" to permit an adjustment of the spacing and therefore of the pressure acting against the sealing member 30". Also, the split ring 38" may be formed of a flexible heat resistant packing to protect the sealing member 30" when channel 36" is filled with hot gases from the exhaust nozzle 16".

It will of course be understood that various changes can be made in the form, details, arrangement, and proportions of the various parts without departing from the spirit and scope of the invention as defined by the following claims.

We claim:

1. A propulsion device having a nozzle with a discharge orifice, said nozzle having a spherical exterior surface adjacent said discharge orifice, a ring member surrounding said spherical exterior surface, said ring member having a spherical interior surface conforming to said spherical exterior surface of said nozzle, means pivotally mounting said ring member on said nozzle for movement thereof into the path of gases discharged from said nozzle, and sealing means between said interior surface and said exterior surface for preventing blowback of gases forward thereof, said sealing means including an annular sealing member, the forward end portion of said ring member having an annular cut-out portion opening through said spherical interior surface, and said annular sealing means lying in said cut-out portion and having a spherical interior surface conforming to and abutting against said spherical exterior surface of said nozzle, said annular sealing member including three annular segments, the rearmost segment being formed of cast iron, one of the two forward segments being formed of plastic and the other of the forward segments being formed of graphite.

2. A propulsion device having a nozzle with a discharge orifice, said nozzle having a spherical exterior surface adjacent said discharge orifice, a ring member surrounding said spherical exterior surface, said ring member having a spherical interior surface conforming to said spherical exterior surface of said nozzle, means pivotally mounting said ring member on said nozzle for movement thereof into the path of gases discharged from said nozzle, and sealing means between said interior surface and said exterior surface for preventing blowback of gases forwardly thereof, said sealing means including an annular sealing member, the forward end portion of said ring member having an annular cut-out portion opening through said spherical interior surface, said annular sealing member lying in said annular cut-out portion and having its interior surface abutting against said spherical exterior surface of said nozzle, the outer periphery of said annular sealing member being spaced from the inner periphery of said annular cut-out portion and defining an annular chamber therebetween, and a gas conducting passage in said ring member opening at one end in said annular chamber and at the other end in said spherical interior surface at a point rearwardly of said cut-out portion.

3. A propulsion device as set forth in claim 2 including a second gas conducting passage in said ring member diametrically opposed to said first mentioned gas conducting passage, said second gas conducting passage opening at one end in said annular chamber and at the other end in said spherical interior surface at a point rearwardly of said cut-out portion.

4. A propulsion device having a nozzle with a discharge orifice, said nozzle having a spherical exterior surface adjacent said discharge orifice, a ring member surrounding said spherical exterior surface, said ring member having a spherical interior surface conforming to said spherical exterior surface of said nozzle and spaced radially outwardly thereof, means pivotally mounting said ring member on said nozzle for movement thereof into the path of gases discharged from said nozzle, the forward end portion of said ring member having an annular cut-out portion opening through said spherical interior surface, a plurality of annular sealing segments defining an annular sealing member disposed in side-by-side sealing engagement with each other within said annular cut-out portion, the opposite ends of said plurality of annular sealing segments sealingly engaging the forward end portion of said ring member at locations thereon defining the end boundaries of said annular cut-out portion, and means disposed radially outwardly of said plurality of annular sealing segments within said annular cut-out portion and urging said plurality of annular sealing segments against said spherical exterior surface of said nozzle in sealing relation therewith, said means urging said plurality of annular sealing segments against said spherical exterior surface of said nozzle comprising a split ring overlying the outer peripheries of said plurality of annular sealing segments and in engagement therewith, and means exerting a radially inwardly directed biasing force against said split ring, said split ring transmitting the radially inwardly directed biasing force to said plurality of annular sealing segments in a substantially uniform distribution pattern.

5. A propulsion device as set forth in claim 4, wherein said means exerting a radially inwardly directed biasing force against said split ring comprises a plurality of springs disposed radially outwardly of said split ring and bearing thereagainst.

6. A propulsion device as set forth in claim 4, wherein said split ring is spaced radially inwardly of the inner periphery of said annular cut-out portion and cooperates therewith to define an annular chamber therebetween, and said ring member having a gas conducting passage opening at one end in said annular chamber and at the other end in said spherical interior surface at a point rearwardly of said annular cut-out portion to provide communication between said annular chamber and the space between said spherical exterior surface of said nozzle and said spherical interior surface of said ring member so that gas pressure from said nozzle may be introduced into said annular chamber to constitute the means exerting a radially inwardly directed biasing force against said split ring.

References Cited by the Examiner
UNITED STATES PATENTS

| | | | |
|---|---|---|---|
| 2,506,111 | 5/1950 | Saint | 277—70 X |
| 2,551,372 | 5/1951 | Haltenberger | 60—35.35 |
| 2,810,592 | 10/1957 | Williams | 285—94 |
| 2,846,280 | 8/1958 | Berg | 277—70 |
| 3,039,264 | 6/1962 | Ernest | 60—35.55 |
| 3,048,010 | 8/1962 | Ledwith | 60—35.55 |
| 3,064,419 | 11/1962 | Ward | 60—35.55 |
| 3,069,853 | 12/1962 | Eder | 60—35.55 |
| 3,102,390 | 9/1963 | Barnet | 60—35.55 |

OTHER REFERENCES

"Solid-Propellant Motors" appearing in the Flight publication, Jan. 13, 1961, pp. 42 and 43.

SAMUEL LEVINE, *Primary Examiner.*

SAMUEL FEINBERG, *Examiner.*